United States Patent [19]

Hamrick et al.

[11] 4,304,103

[45] Dec. 8, 1981

[54] HEAT PUMP OPERATED BY WIND OR OTHER POWER MEANS

[75] Inventors: Joseph T. Hamrick, Roanoke; Leslie C. Rose, Rocky Mount, both of Va.

[73] Assignee: World Energy Systems, Fort Worth, Tex.

[21] Appl. No.: 142,766

[22] Filed: Apr. 22, 1980

[51] Int. Cl.³ .......................... F25B 1/00; F25B 27/00
[52] U.S. Cl. ...................................... 62/228; 60/405; 417/4; 62/236
[58] Field of Search .................... 417/3, 4, 5, 6, 43, 417/334, 335; 62/236, 510, 196 A, 228 D; 60/405

[56] References Cited

U.S. PATENT DOCUMENTS 2,539,862  1/1951  Rushing ............................... 62/236
3,923,423 12/1975  Lauck .................................. 417/3

Primary Examiner—William E. Wayner
Assistant Examiner—Harry Tanner
Attorney, Agent, or Firm—Arthur F. Zobal

[57] ABSTRACT

A heating and/or cooling system comprising a windmill for driving a first refrigerant compressor in parallel with a second refrigerant compressor driven by an electric motor or other power means. The second compressor operates the system when the wind velocity is low. When the wind velocity becomes high enough, the refrigerant pressure created by the wind driven compressor, is used to automatically shut off power to the second compressor. The wind driven compressor then takes over the function of the second compressor.

2 Claims, 1 Drawing Figure

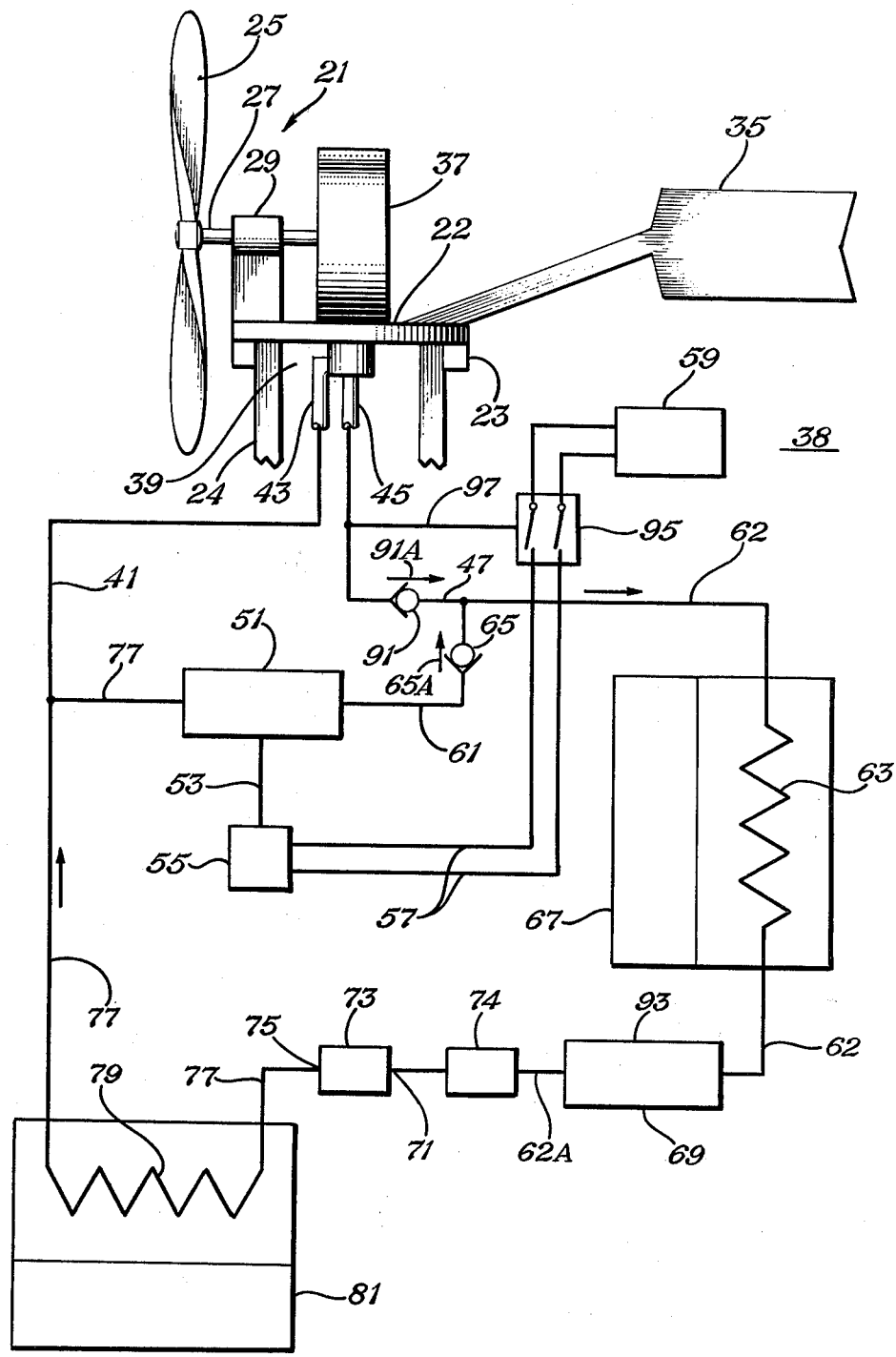

HEAT PUMP OPERATED BY WIND OR OTHER POWER MEANS

FIELD OF THE INVENTION

The present invention relates to a heating and/or cooling system operated by the wind or other power means.

DESCRIPTION OF THE PRIOR ART

U.S. Pat. Nos. 4,143,522, 4,015,962 and 2,539,862 disclose windmills for operating heating and/or cooling systems.

SUMMARY OF THE INVENTION

It is an object of the present invention to provide a unique and improved wind operated heating and/or cooling system.

The system comprises wind operated means for driving a first refrigerant compressor in parallel with a second refrigerant compressor driven by an electric motor or other power means. The second compressor operates the system when the wind velocity is low. When the wind velocity becomes high enough, the refrigerant pressure created by the wind driven compressor is used to automatically shut off power to the second compressor. The wind driven compressor then takes over the function of the second compressor.

BRIEF DESCRIPTION OF THE DRAWING

FIG. 1 illustrates the system of the present invention.

DESCRIPTION OF THE PREFERRED EMBODIMENT

Referring now to FIG. 1, there is illustrated a windmill 21 supported on a platform 22. The platform 22 is supported by a base 23 to swivel. Base 23 in turn is supported by poles 24. The windmill 21 comprises a wind driven propeller 25 connected to a shaft 27 which is supported for rotation by bearings 29 mounted on platform 22. Tail fin 36 is used to counter torque and keep the propeller 25 facing downwind. As the propeller 25 is turned by the wind, the shaft 27 drives a compressor 37 which forms part of a heat pump 38. The speeds at which commercially available piston type refrigerant compressors are driven match the speeds of commercially available windmills of required power. Since the compressor swivels with the windmill, a concentric rotary joint 39 is provided to conduct the refrigerant to and from the compressor. The refrigerant is drawn into the compressor through the outer annulus of the rotary joint. It is applied to the outer annulus by way of conduit 41 and conduit 43. The compressed refrigerant gas is discharged through the center conduit 45 of the rotary joint. From conduit 45 it flows through conduit 47.

The heat pump 38 also comprises a compressor 51 operated by the output shaft 53 of an electric motor 55. Electrical leads 57 extend from a conventional electric power source 59 to motor 55 for operating the motor. A conduit 61 is attached to the outlet of the compressor 51 and is coupled to conduit 62. Conduit 62 is formed into a condensing coil 63. Member 65 is a one-way valve coupled to conduit 61 which allows fluid to flow in conduit 61 only in the direction of arrow 65A. A blower 67 is provided to blow air around the coil 63. The other end of conduit 62 is attached to the inlet of a receiver 69. The outlet of the receiver 69 is attached to the inlet 71 of an expansion valve 73 by way of conduit 62A. Reference numeral 74 identifies a filter. The outlet 75 of the expansion valve is attached to a conduit 77 which is formed into an expansion coil 79. The other end of the conduit 77 is attached to the inlet of the compressor 51. Reference numeral 81 identifies a blower for blowing air around coil 79. Both of coils 63 and 79 may be located inside of a residence or building. Conduit 47 is coupled from the outlet of the compressor 37 to conduit 62. Member 91 is a one-way valve coupled to conduit 47 which allows fluid to flow in conduit 47 only in the direction of arrow 91A. Conduit 41 is coupled from conduit 77 to the inlet of compressor 37.

The system comprising compressor 51, conduit 61, conduit 62, coil 63, expansion valve 73, conduit 77, coil 79, conduit 41, compressor 37 and conduit 47 is a closed system containing a refrigerant identified at 93, which may be for example trichloromonofluoromethane also know as Freon-11. It is to be understood that other types of refrigerants may be used. The system operates to heat the coils 63 for heating purposes and to cool the coils 79 for cooling purposes in the summer or to dehumidify the air.

Member 95 is a pressure switch for connecting or disconnecting leads 57. Such switches are commercially available. The switch 95 is coupled to conduit 47 by way of conduit 97. Normally the switch 95 will be closed whereby leads 57 are connected from source 59 to the motor 55 for supplying power to the motor. When the fluid pressure in conduit 47 and hence in conduit 97 becomes high enough, it opens the switch 95 to disconnect leads 57 thereby terminating power to motor 55.

When the wind velocity is low, the fluid pressure in conduit 47 will not be high enough to open switch 95 whereby compressor 51 is driven by motor 55 to operate the heat pump. The operation is as follows.

Starting with the compressor 51, the refrigerant 93 on the inlet side of the compressor 51 is compressed and then passes into coils 63 where it cools and condenses giving up its heat of condensation. The blower 67 circulates air around the coils 63 where it is heated and used for space heating. After condensing and leaving the coils 63, the refrigerant 93 collects in tank receiver 69. It passes through filter 74 and the thermostatically controlled expansion valve 73. When liquid refrigerant 93 passes through valve 73 into the region of low pressure, it evaporates and provides cooling for coils 79. The blower 81 circulates air across the coils 79 where it is cooled and dehumidified. Thus, the system also serves to cool and dehumidify. From the coils 79, the refrigerant 93 returns to the compressor 51 through line 77. Although not shown, suitable controls will be provided to control the opening and closing of the expansion valve 73 as a function of preset temperature of the coils 63 and 79 dependent upon whether the system is used for heating or cooling at a given time. Suitable venting devices also may be provided to vent the coils 63 and 79 to the exterior of the residence or building when they are not needed for heating or cooling purposes. Although not shown, conventional electric power may be employed to operate the blowers 67 and 81 and the control system.

During operation of compressor 51, check valve 91 prevents the flow of refrigerant back through line 47 into compressor 37. When the wind velocity is high enough to operate compressor 37 and raise the refrigerant to the required pressure, the refrigerant from line 77 will flow through conduit 41 into compressor 37 and after compression will flow out through line 47. When the pressure of the compressed gas in line 47 reaches a certain level, it will then actuate pressure switch 95 by way of conduit 97 disconnecting leads 57 from motor 55 thereby cutting off the motor. Check valve 91 will simultaneously open admitting refrigerant to conduit 61. Check valve 65 in line 61 will then function to prevent flow of refrigerant back to compressor 51. When the wind velocity drops below an operational level, the pressure will drop on pressure switch 95 thereby connecting leads 57 to motor 55 whereby power will again be applied to operate motor 55. Alternatively the motor drive 55 may be turned off manually if wind only is to be relied upon.

In some cases it may be desirable to provide a second thermostat in the house for operating a mechanism for overriding the pressure switch 95 in the event that the desired heating or cooling is not achieved by operation of the windmill alone. During the override period, the system will allow both compressors 37 and 51 to operate simultaneously.

While the actual system may use the same coils or heat exchangers for cooling and heating by redirecting the refrigerant by means of appropriate valves, it simplifies the explanation of the system to say that heating is achieved by conducting the air that passes over the condensing coils 63 to the area to be heated and the air that passes over the expansion coils 79 to the area to be cooled. In winter the area that is cooled is the outdoors. In the process the expanded refrigerant is actually heated by the outside air, and on the average the heat pump effectively produces double the amount of heat that could be extracted by converting the windmill energy directly into heat by friction alone.

Although the compressor 51 was described as being operated by an electric motor 51, it is to be understood it could be operated by a natural gas or gasoline engine started by an electric starter. In this embodiment, pressure switch 95 would operate to turn the engine off or on depending on the pressure applied to the switch.

The windmill may be a three bladed design with speed limiting counter weights, that change the pitch of the blades.

One of the many objectives in using a heat pump which may produce two to three times as much heat from the wind as can be produced by other methods is to reduce the required diameter of a windmill to an economical size. The heat pump together with solar heating and insulation can result in a windmill of economical size for an average home.

If a heat pump of 6 KW is to be matched with a windmill that is set to reach its maximum rpm in a 27 mile per hour wind, a windmill approximately 14 feet in diameter would be selected. When the selection is made in this manner, there is assurance that the heat pump can accommodate the maximum output of the windmill.

Heat reservoirs may consist of water tanks, rock beds, or fusible salt tanks. A water tank only will be considered in the following example. In certain areas of the U.S., for the major portion of the time the wind is below 20 miles per hour. At a wind velocity of 20 miles per hour the output of a 14 foot diameter windmill and heat pump combined is approximately 20,000 Btu per hour.

If is is assumed that 7000 Btu per hour are needed for heating, there would be a surplus of 13,000 Btu per hour or 312,000 Btu per day. The air leaving the heat pump should reach the 105° F. range. Starting with 65° F. water it would require approximately 7800 lbs or 936 gallons of water to store the heat generated by wind blowing 36 hrs at 20 miles per hour. A heat exchanger in the outlet duct of the heat pump with water circulating through it to a 1500 gallon insulated water storage tank would be required. The stored heat can be used for heating as the wind velocity drops or coils inside the storage tank can serve to preheat the water entering the domestic hot water tank. An unpressurized 1500 gallon capacity concrete tank normally used for septic systems insulated with polystyrene foam can be used for water storage.

We claim:

1. A heating and/or cooling system comprising:
first coil means having an inlet and an outlet,
second coil means having an inlet and an outlet,
said outlet of said first coil means being coupled to the inlet of said second coil means,
a first compressor having an inlet and an outlet,
a second compressor having an inlet and an outlet,
wind operated means for driving said first compressor,
power means for operating said second compressor,
first conduit means coupled to said outlet of said first compressor and to said inlet of said first coil means,
second conduit means coupled to said outlet of said second compressor and to said inlet of said first coil means,
conduit means coupling said outlet of said second coil means to said inlets of said first and second compressors,
one-way valve means for allowing fluid in said first conduit means to flow only from said outlet of first compressor toward said inlet of said first coil means,
one-way valve means for allowing fluid in said second conduit means to flow only from said outlet of said second compressor toward said inlet of said first coil means,
pressure actuated switch means coupled to said first conduit means and responsive to a high fluid pressure in said first conduit means for shutting down said power means,
said pressure actuated switch means turning on said power means when the fluid pressure in said first conduit means is low.

2. The system of claim 1, wherein:
said power means comprises an electric motor for operating said second compressor,
electrical leads coupled from a source of electrical power to said electric motor for supplying electrical power to said electric motor,
said pressure actuated switch means being coupled to said first conduit means and to said electrical leads and responsive to a high fluid pressure in said first conduit means for disconnecting said electrical leads from said electric motor,
said pressure actuated switch means connecting said electrical leads to said electric motor when the fluid pressure in said first conduit means is low.

* * * * *